United States Patent [19]
van der Lely

[11] Patent Number: 6,148,766
[45] Date of Patent: Nov. 21, 2000

[54] CONSTRUCTION INCLUDING AN IMPLEMENT FOR AUTOMATICALLY MILKING ANIMALS

[76] Inventor: Cornelis van der Lely, 7 Brüschenrain, CH-6300 Zug, Switzerland

[21] Appl. No.: 09/134,740

[22] Filed: Aug. 14, 1998

[30] Foreign Application Priority Data

Dec. 17, 1996 [NL] Netherlands ............................ 1004804
Dec. 15, 1997 [WO] WIPO ...................... PCT/NL97/00698

[51] Int. Cl.$^7$ .................................. A01J 3/00; A01J 5/00
[52] U.S. Cl. .................................... 119/14.08; 119/14.01; 119/14.14
[58] Field of Search ............................. 119/14.01, 14.02, 119/14.03, 14.08, 14.14, 14.18

[56] References Cited

U.S. PATENT DOCUMENTS

| | | | |
|---|---|---|---|
| 5,080,040 | 1/1992 | Van Der Lely et al. | 119/14.09 |
| 5,167,201 | 12/1992 | Peles | 119/14.18 |
| 5,383,423 | 1/1995 | Van Der Lely | 119/158 |
| 5,596,945 | 1/1997 | Van Der Lely | 119/14.03 |
| 5,678,506 | 10/1997 | Van Der Berg et al. | 119/14.18 |
| 5,771,837 | 6/1998 | Van Der Lely | 119/14.02 |
| 5,778,820 | 7/1998 | Van Der Lely et al. | 119/14.18 |
| 5,784,994 | 7/1998 | Van Der Lely | 119/14.08 |

*Primary Examiner*—Peter M. Poon
*Assistant Examiner*—Judith A. Nelson
*Attorney, Agent, or Firm*—Penrose Lucas Albright

[57] ABSTRACT

A system for automatically milking animals comprising an area where the animals can move about freely. A milking robot automatically connects teat cups to an animal's teats in a milking compartment having a concentrate station. The entire system, including the concentrate station, is computer controlled. Doors in the milking compartment automatically open for the entry and departure of animals. An automatic cleaning member cleans the animal's teats and an automatic cleaning system automatically cleans the entire milk line system or a selected part thereof. The herd is divided by a computer into milk production groups with a computer defined priority criteria for admitting a specific group of animals into the milking compartment prior to another group. Each robot arm is controlled by three parallelogram structures in series, each being separately controlled by a piston and cylinder unit or an electromotor, the lowermost structures being capable of extending teat carriers under the cows udder, the forward structure, when so extended, being at an angle of roughly 45° and the aft structure being at an angle of roughly 60°. Retractable cables connect each teat cup to a teat cup carrier. Each teat cup is connected from its upper aspect by a cable to a spool mounted on the upper side of the milking compartment, each spool being computer controlled by an electromotor to retain the teat cups in upright positions after their disconnection from the teats when being retracted to the teat carriers.

20 Claims, 3 Drawing Sheets

CONSTRUCTION INCLUDING AN IMPLEMENT FOR AUTOMATICALLY MILKING ANIMALS

FIELD OF THE INVENTION

The invention relates to an apparatus for automatically milking animals, such as cows or goats, the apparatus including a stable or cowshed in which the animals are allowed to move freely.

BACKGROUND OF THE INVENTION

Such constructions are known. The performance of such constructions should however be improved. In this way the production of milk is increased and the milk price to the customers may be decreased. In an automatic milking system, the animals are permitted to move freely about in an area which may include a fenced-in shed and pasture such as is disclosed in U.S. Pat. No. 5,596,945 of van der Lely, dated Jan. 28, 1997, which is directed to a construction for automatically milking animals comprising a milking parlor with a milking robot and a covered area where the animals may move about freely. The milking parlor includes two adjacently arranged milking compartments with a milking robot installed between the compartments so as to be movable from one to the other under the udder and teats of an animal therein, whereby an animal is first milked in a compartment on one side, and then another animal is milked in the other compartment from the other side. Installed between the compartments is also a mechanism for automatically cleaning the animal's udder and teats before they are milked and while the animal in the other compartment is being milked. Another example of an automatic milking system is disclosed in U.S. Pat. No. 5,771,837 of Jun. 30, 1998, issued to van der Lely. This discloses an apparatus for automatically milking animals, such as cows, by a milking machine which is under the control of a computer for automatically connecting teat cups to the teats of the animal, for automatically milking the animal, and for automatically disconnecting the teat cups from the animal. The apparatus is further provided with an animal recognition or identification system which is in communication with the computer system. A system for automatically milking animals, such as cows, which includes a metering device that is computer controlled for dispensing fodder to an animal in a milking compartment is disclosed in U.S. Pat. No. 5,778,820 of Jul. 14, 1998, to van der Lely et al. This patent also discloses a laser detector for locating and emplacing teat cups on an animal's teats while it is in the milking compartment, milking the animal and upon the conclusion thereof withdrawing the teat cups and moving them from underneath the animal. The apparatus has a metering device for dispensing fodder concentrate into the feeding trough. The measuring device is computer controlled and with the aid of the computer, the anticipated feeding period is predetermined based on the animal's identity. The fodder is distributed at least substantially uniformly over the actual feeding period so that the dispensing of fodder terminates and the feeding period ends approximately at the same time the milking operation ends and the milking robot has removed the milking apparatus from under the animal so able not to impede the animal's exit from the compartment. An implement for cleaning the teats of milk producing animals for use in an automatic milking system is disclosed in U.S. Pat. No. 5,383,423 of Jan. 24, 1955, to van der Lely. A computer controls a rotatable apparatus which has mounted thereon four cleaning brushes for receiving the teats of a farm animal in a milking compartment, cleaning them with a liquid cleaning agent applied to the brushes and also drying same. The same implement on which the cleaning implement is mounted includes apparatus for automatically milking the animal in the milking compartment. U.S. Pat. No. 5,080,040 of Jan. 14, 1992, to van der Lely et al, is directed to an automatic milking system for dairy animals comprising individual teat cups attachable to the corresponding teats of the animal's udder, a measuring device to determine the volume of milk discharged from individual teats, a central vacuum system to aid the discharge of the milk from the teats as well as to move both milk and cleaning fluid through the system's fluid lines, a cooling tank and an array of sensors to determine various parameters relating to the milk and the milking system, including temperature sensors, milk conductivity sensors, air-to-milk ratio sensors, pressure sensors and fluid level sensors. These sensors are arranged at various places in the milking system including in the individual teat cups. The system diverts milk from milk otherwise collected that has too high of a temperature or more than a predetermined conductivity indicating it may not have been produced in a healthy teat or udder. U.S. Pat. No. 5,784,994 of Jul. 28, 1998, to van der Lely, discloses an apparatus and method for automatically milking animals, such as cows, confined within a milking compartment. The milking apparatus includes four robotic arms for individually emplacing and removing teat cups from the animal's teats and a separate robot arm for a detector that scans the animal's teats for the purpose of effecting a computer-controlled emplacement of the teat cups thereon. The detector includes a laser which beams through a window on the detector carried by an omni-directing member having has a four-bar parallelogram member so that the beams are both horizontally and vertically movable. The longitudinal sides of the milking compartment has spray members for cleaning teat cups which, when not used for milking, are under the spraying members. Each of the robotic arms for emplacing and removing the teat cups contains cords attached to the teat cups by which they are drawn tautly against the robotic arms for emplacement and removal and played out so that the animal can move within limits after the teat cups are emplaced on the animal's teats.

SUMMARY OF THE INVENTION

The broad objective of the invention is a fully automatic milking system.

In accordance with the invention, this is achieved by an apparatus which includes one or more combinations of the following characteristics:

a milking robot for automatically connecting the teat cups;

a concentrate station;

a management system;

and a combination of selected combinations of the following characteristics:

an admission selection framework for the milking compartment with departure option;

an automatic cleaning member for cleaning the teats;

a flexible connection between the robot arm and the teat cups after the latter have been connected to the teats;

an automatic milk control unit for controlling the quality of the milk, as well as milk flow separation means with the aid of which inferior milk is separated automatically;

an automatic milk sampling device by means of which a milk sample is provided for analysis from each animal;

disconnecting means for individually disconnecting the teat cups from the teats when it has been determined that a specific udder quarter has been milked out;

a disinfecting device by means of which the udder is disinfected automatically after milking;

an automatic cleaning device with the aid of which the entire milk line system or a limited part thereof is cleaned automatically;

an animal-dependent, time adjusted metering unit, by means of which a specific amount of concentrate is fed to an animal;

a feed mixing unit with the aid of which, on an animal-dependent basis, a specific feed mixture is made;

a computer program by means of which, on the basis of historical data of the relevant animal, its estimated milk production is determined and by means of which, on the basis of the estimated milk production, it is determined whether or not an animal will be milked by the milking robot;

a heat registration unit;

a mastitis registration unit;

a computer into which it is inputted that only a limited number of udder quarters are to be milked out;

a computer program by means of which the livestock is divided into milk production groups and by means of which a priority is defined for admitting an animal out of a milk production group into the milking compartment prior to another animal out of another milk production group.

In accordance with an inventive feature, the milking robot comprises at least one robot arm which is provided with a first and second parallelogram structures located in a first plane in the longitudinal direction of the milking compartment, as well as a third parallelogram structure located in a second plane which is at an angle with the first plane.

The invention also relates to an apparatus for automatically milking animals, such as cows or goats, which is provided with a milking robot for automatically connecting teat cups to the teats of an animal to be milked, and respectively disconnecting same therefrom; the invention is characterized in that the milking robot comprises at least one robot arm which is provided with a first and second parallelogram structures that are located in a first plane disposed in the longitudinal direction of the milking compartment, as well as a third parallelogram structure located in a second plane which is at an angle to the first plane.

According to a further inventive feature, near each longitudinal side of the milking compartment there are disposed two robot arms behind each other. According to again another inventive feature, seen from the front side of the milking compartment, the second plane of the third parallelogram structure of a first robot arm is at an angle of between 40° and 50°, preferably 45°, with the first plane, while the second plane of the third parallelogram structure of a second robot arm is at an angle of between 55° and 65°, preferably of 60°, to the first plane. The mutual differences in the oblique positions of the third parallelogram structure of the two robot arms has the advantage that space is created between the first and the second parallelogram structures of the two robot arms, so that the parallelogram structure mutually have adequate freedom of movement.

The invention yet further relates to an apparatus for automatically milking animals, such as cows or goats, which is provided with a milking robot for automatically connecting teat cups to the teats of an animal to be milked, and respectively disconnecting same therefrom; the invention characterized in that, seen from the front side of the milking compartment, the second plane of the third parallelogram structure of a first robot arm is at an angle of between 40° and 50°, preferably of 45°, with the first plane, while the second plane of the third parallelogram structure of a second robot arm is at an angle of between 55° and 65°, preferably of 60°, with the first plane.

In accordance with another aspect of the invention, on the third parallelogram structure there is arranged a teat cup carrier carrying a teat cup at its end. According to again another inventive feature, the robot arm comprises a retracting member by means of which the teat cup, when the latter is disconnected from a teat, is retracted to the teat cup carrier.

In order to prevent the teat cups from falling on the ground during disconnection, according to an inventive feature, the teat cups are provided with cables or similar transport means, with the aid of which they are kept in an approximately upwardly orientated position when being moved towards the teat cup carrier and when being disconnected from at teat. According to a yet further inventive feature, the cable extends substantially in vertical direction and is connected at one end with a cable fastening means which is disposed on the milking compartment, while the cable is connected with its other end with a cable fastening means which is disposed near the upper side of the teat cups. According to again still another inventive feature, the cable fastening means is disposed near the upper side of the milking compartment. According to a further aspect of the invention, the transport means are computer-controlled.

In accordance with another inventive feature, the apparatus is provided with a robot arm which includes a detector, such as a laser, for determining the position of the teats of an animal to be milked. According to a further inventive feature, the robot arm including the detector is disposed near one longitudinal side of the milking compartment.

In order to enable the automatic connection of the teat cups to the teats, according to again another inventive feature, the robot arms are provided with computer-controlled pistons and cylinders or electromotors.

BRIEF DESCRIPTION OF THE DRAWINGS

For a better understanding of the invention, reference will now be made to the accompanying drawings, in which.

DETAILED DESCRIPTION OF THE PREFERRED EMBODIMENTS

Figure 1:
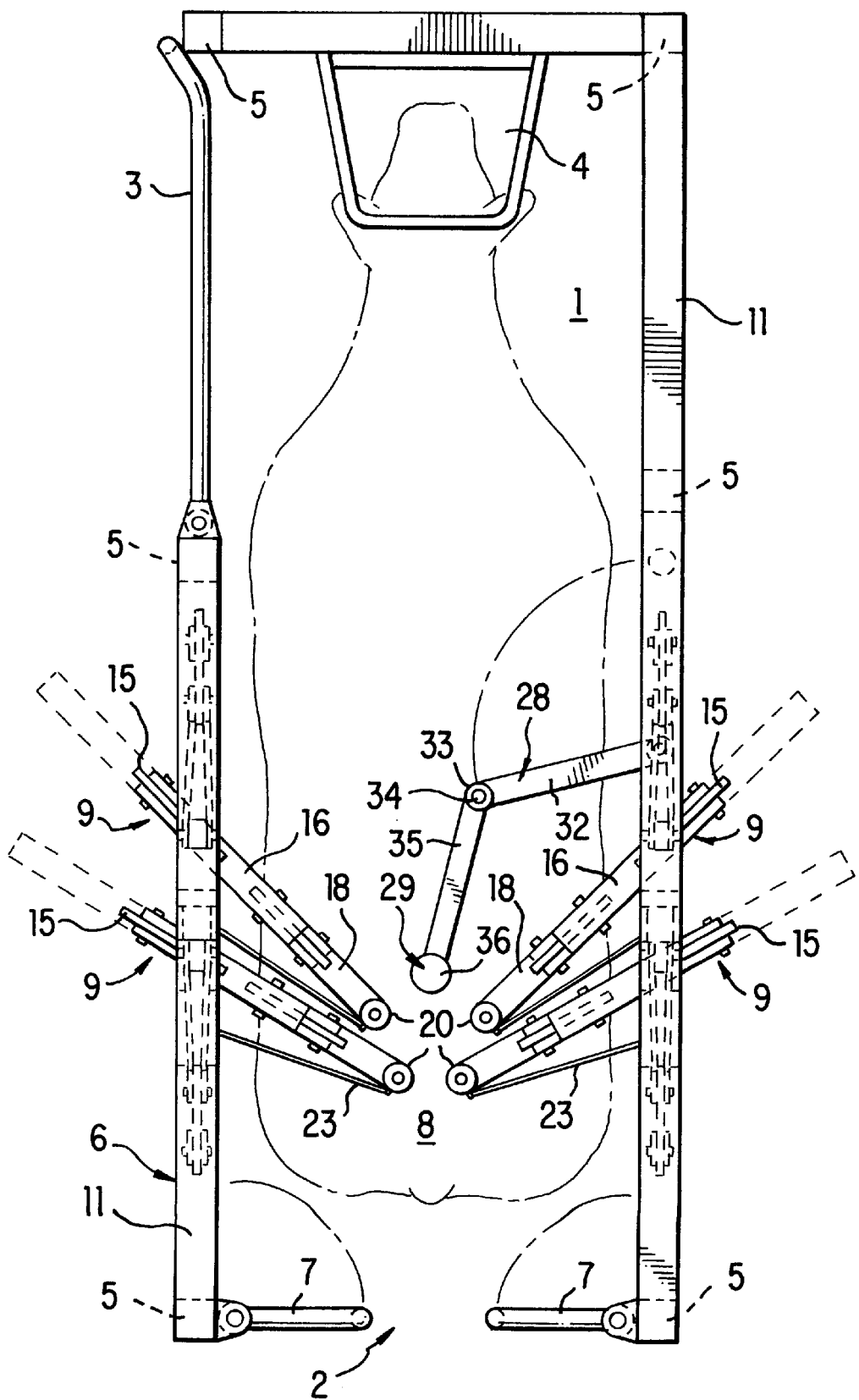
FIG. 1 is a plan view of an apparatus for automatically milking animals, such as cows or goats.
Figure 3:
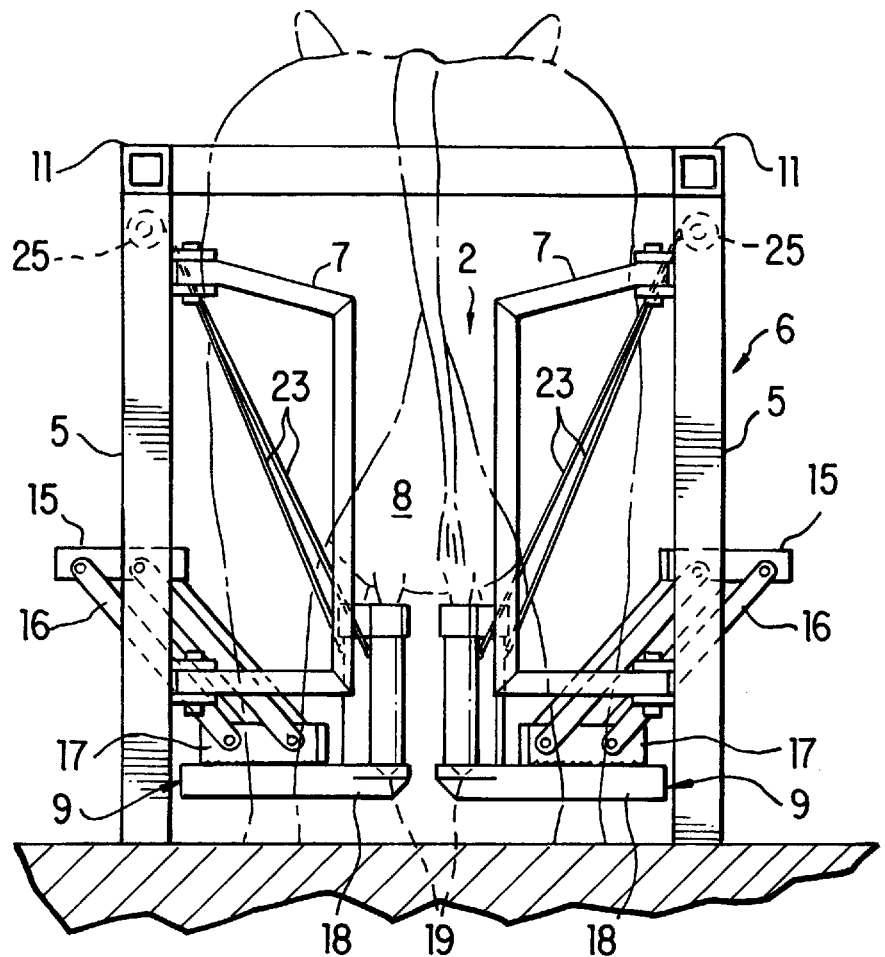
FIG. 3 is a rear view of the apparatus shown in FIGS. 1 and 2.

FIG. 1 is a plan view of a milking compartment 1 which is provided at the rear side with an entrance door 2, via which the animal can enter milking compartment 1, and at a longitudinal side with an exit door 3, via which the animal can leave milking compartment 1. At the front side of milking compartment 1 is furthermore disposed a feeding trough 4 in which fodder, such as concentrate, can be fed to the animal. As shown in FIG. 3, entrance door 2 comprises two swing doors 7 which are fixed to stands 5 of the milking compartment's frame 6. Swing doors 7, as well as entrance door 2, are operated automatically by means of a computer.

Figure 2:
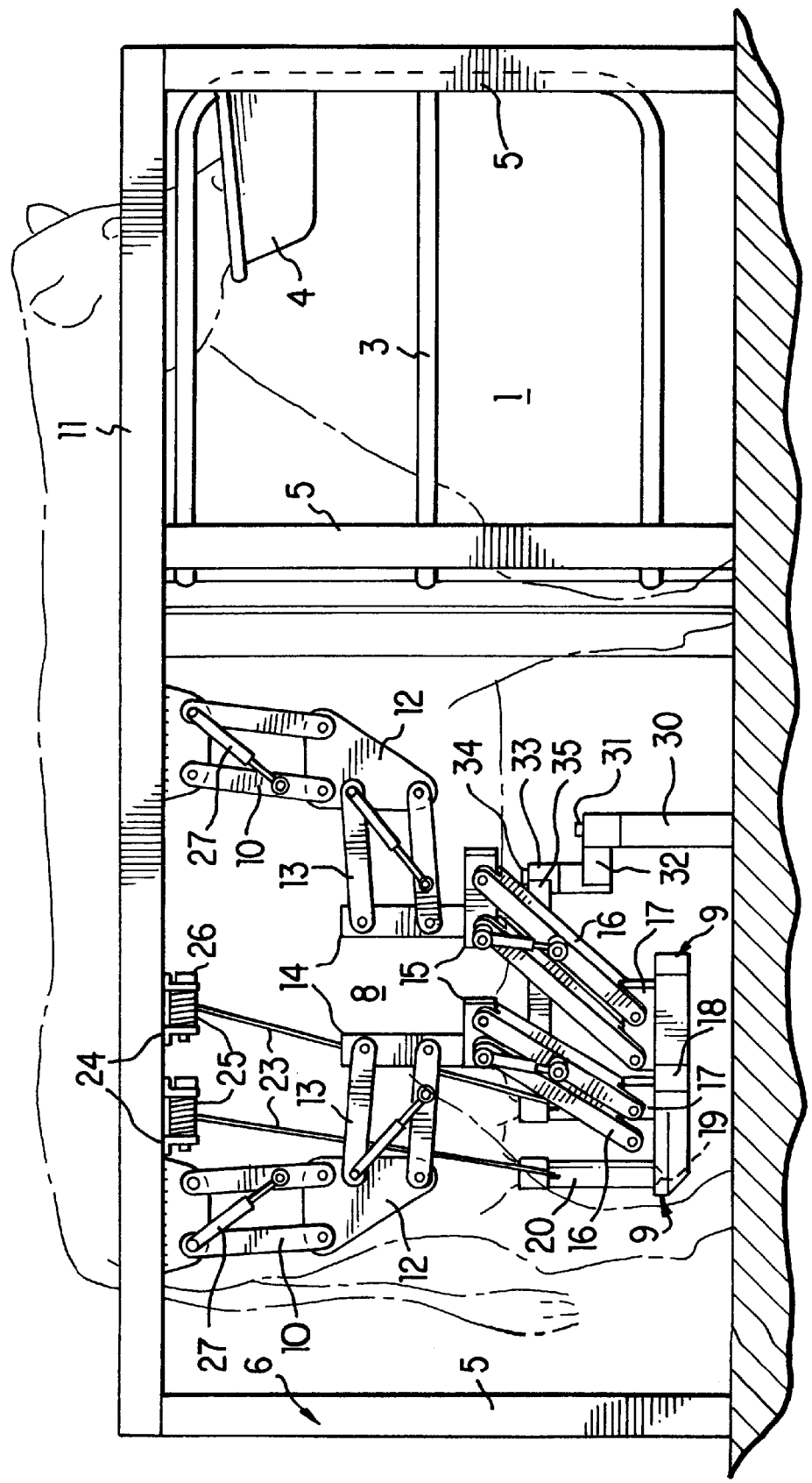
FIG. 2 is a side elevational view of the apparatus for automatically milking animals shown in FIG. 1.
Figure 4:
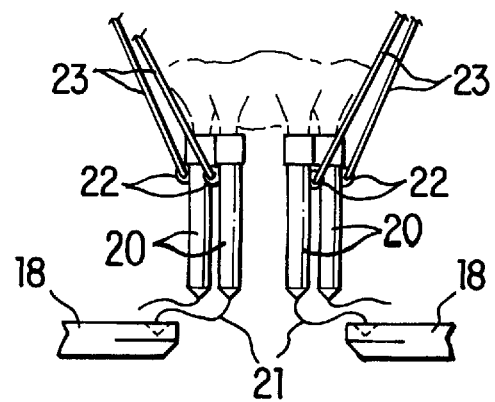
FIG. 4 shows a detail of robot arms represented in FIG. 3.

In milking compartment 1 a milking robot 8 is provided for automatically milking the animals therein. Milking robot 8 comprises four robot arms 9 which are located in two pairs, one pair on each longitudinal side of milking compartment 1, behind each other and are mounted on frame 6. As shown in FIG. 2, each robot arm 9 is provided with a first parallelogram construction 10 attached by means of a lug to the upper beam 11 of frame 6. The other end of first parallelogram construction 10 is connected with a triangular plate 12 on which there is disposed a second parallelogram construction 13. First parallelogram construction 10 and second parallelogram construction 13 are both located in a plane which extends in the longitudinal direction of milking compartment 1 and is located below upper beam 11. The two second parallelogram constructions 13 of robot arms 9, located behind each other, are attached to the triangular plates 12 in such a manner that the two ends of the second parallelogram constructions 13 are facing each other. At the end of each second parallelogram construction 13 is disposed a downwardly orientated shaft 14 located in the aforementioned plane which extends in the longitudinal direction of milking compartment 1. On shaft 14 of the forward robot arm 9 is a horizontal rod 15 which, as seen from above, is disposed at an angle of approximately 45° with the plane that extends in the longitudinal direction of milking compartment 1. The aft robot arm 9, as seen in FIG. 2, is also provided with a horizontal rod 15 which is at an angle of approximately 60° with the aforesaid plane extending in the longitudinal direction of milking compartment 1. At the other longitudinal side of milking compartment 1 the two robot arms 9 are designed in the same manner. On each of rods 15 a third parallelogram construction 16 is provided. These third parallelogram constructions 16 are located in the same planes as the horizontal rods 15. At the end of each third parallelogram construction 16 a horizontal bar 17 is provided which is connected with a teat cup carrier 18. Each of the teat cup carriers 18 also extends in the same vertical planes in which rods 15 are located. Near the end of each teat cup carrier 18 is a conical seat 19 in which a corresponding teat cup 20, including a retracting member (not shown), is retained. After each teat cup 20 has been connected to a teat, the retracting member is released, so that the corresponding teat cup 20 is freed from its teat cup carrier 18 and its only connection to its teat cup carrier 18 is via a cable 21 (FIG. 4). Each of the teat cups 20 is provided near its upper end with a cable fastening means 22 which is connected to a further cable 23. The other end of each further cable 23 is connected with a further cable fastening means 24 mounted on the lower side of the frame's upper beam 11. Each cable fastening means 24 comprises a reel 25 around which a further cable 23 is wound. Reel 25 can be rotated by a stepper motor 26. During disconnection of each teat cup 20, the corresponding stepper motor 26, controlled by the computer, is operated in a manner so that when moving towards its teat cup carrier 18, teat cup 20 is retained in an approximately upwardly orientated disposition. In this way each teat cup 20 is prevented from contacting the floor of milking compartment 1 during its disconnection from the animal's teat and consequently from being contaminated.

As shown in FIG. 2, all the parallelogram constructions are furthermore provided with computer-controlled piston and cylinders 27 by means of which the teat cups 20 are positioned under the teats, whereafter they are connected thereto by an upward movement.

As shown in FIGS. 1 and 2, the apparatus according to the invention is additionally provided with a further robot arm 28 including a detector 29 for determining the position of the teats of an animal to be milked. The further robot arm 28 comprises a vertical stand 30 which is disposed on the floor of milking compartment 1 near the longitudinal side thereof. Near its upper side vertical stand 30 comprises an axle 31 about which a horizontally extending arm 32 of the further robot arm 28 is pivotably arranged. By means of a stepper motor horizontal arm 32 can be pivoted about axle 31. Near the other end of horizontal arm 32 is a vertical stand 33 which is provided on its upper end with an axle 34. A further horizontal arm 35 is pivotably arranged on axle 34. Further horizontal arm 35 can also be pivoted about axle 34 by means of a stepper motor under control of a computer. At the end of further horizontal arm 35 is disposed a laser 36 with the aid of which the positions of the teats of an animal to be milked can be determined.

The function of the above-described apparatus for automatically milking animals, such as cows or goats, is as follows:

After an animal has been identified by an animal identification system, the computer decides, on the basis of a selected parameter such as the estimated milk production, whether the animal is to be milked. If the animal is to be milked, swing doors 7 are opened automatically, and thereafter the animal, lured by concentrate in feeding trough 4, enters milking compartment 1. The further robot arm 28, including laser detector 29, is subsequently positioned under the animal, whereby the teats' locations are determined. By means of the lower piston and cylinders 27 of the third parallelogram construction teat cup carriers 18 are moved from the positions represented in dashed lines in FIG. 1 to under the udder of the animal. With the aid of the other pistons and cylinders of first and second parallelogram constructions 10 and 13, teat cups 20 are positioned under the animal's teats, and thereafter, by operating piston and cylinders 27 of the second parallelogram constructions, they are connected to the teats of an animal to be milked. After teat cups 20 have been connected to the teats of the animal, retracting members are released and teat cup carriers 18 are pivoted downwardly, so that teat cups 20 will be in a suspended position free from teat cup carriers 18. When an udder quarter has been milked out, the relevant retracting member is activated, and the corresponding teat cup 20 is moved in the direction of conical seat 19 of teat cup carrier 18. At the same time the further cable 23 of a transport means is retained in a taut condition by stepper motor 26, so that teat cup 20, during disconnection, is maintained in an upwardly orientated position. After all teat cups 20 have been disconnected, exit door 3 is opened by means of the computer, whereupon the animal can depart from milking compartment 1.

Although I have disclosed the preferred embodiment of my invention, it should be understood that it is capable of other adaptations and modifications within the scope of the following claims.

Having disclosed my invention, what I claim is new and to be secured by Letters Patent of the United States of America is:

1. An apparatus for automatically milking animals, the apparatus comprising a confined area in which the animals are allowed to move about freely, a milking compartment which can be entered from said area, a milking robot having at least one robot arm provided with a first and a second parallelogram structure, each said structure located in a first plane extending in the longitudinal direction of the milking compartment and a third parallelogram structure located in a second plane which is at an angle with the first plane.

2. An apparatus in accordance with claim 1 comprising four of said robot arms wherein two of said robot arms are disposed at each longitudinal side of said milking compartment, each of said two said robot arms disposed on each side of said milking compartment being disposed one behind the other.

3. An apparatus in accordance with claim 2, wherein said third parallelogram structure of said two robot arms on each side of said milking compartment is at an angle between about 40° and 65° relative to the underlying floor of said milking compartment.

4. An apparatus in accordance with claim 3, wherein said angle is between about 45° and 60°.

5. An apparatus in accordance with claim 1, wherein said third parallelogram structure is connected to a teat cup carrier, said teat cup carrier carrying a teat cup at its end.

6. An apparatus in accordance with claim 5, comprising a flexible retracting member which connects said teat cup to said teat cup carrier, said flexible retracting member being retracted in said teat cup carrier when said teat cup is disconnected from a teat.

7. An apparatus in accordance with claim 5, comprising transport means connected to the upper part of said teat cup and extending upwardly therefrom to where it is interconnected to a side of said milking compartment, said transport means performing the function of retaining said teat cup in an upright position at all times during the milking operation when said teat cup is not emplaced on the teat of an animal being milked in said milking compartment.

8. An apparatus for automatically milking animals, which comprises a milking compartment, a milking robot having at least one robot arm, said robot arm comprising a teat cup carrier which carries a teat cup at its end, said teat cup being connected to said teat cup carrier by a retracting member which retracts said teat cup to said teat cup carrier when said teat cup is disconnected from a teat of an animal being milked in said milking compartment, and upwardly extending transport means which interconnects an upper aspect of said teat cup with an upper aspect of a side of said milking compartment, said transport means serving the function of maintaining said teat cup in a substantially upright disposition when said teat cup is disconnected from a teat and is retracted to said teat cup carrier by said retracting member, said robot arm comprising in series three parallelogram structures, the arrangement of each of said parallelogram structures being controlled by computer control means.

9. An apparatus in accordance with claim 8, wherein said transport means comprises fastening means which interconnects it to the upper aspect of the side of said milking compartment, said fastening means includes control means for maintaining said teat cup in a substantially vertical disposition when it is disconnected from an animal's teat and retracted by said retracting member to said teat cup carrier.

10. An apparatus in accordance with claim 9, wherein said control means is computer controlled.

11. A system for automatically milking animals, which comprises an area in which the animals are permitted to move about freely, a milking compartment, a milking robot at said milking compartment for automatically connecting teat cups to an animal, a concentrate station for feeding an animal in said milking compartment, identification means for identifying an animal at said milking compartment, said identification means associated with a computer program which, on the basis of historical data of an animal at said milking compartment, determines the estimated milk production for such animal and, on the basis of such estimated milk production, determines whether or not such animal will be milked by said robot in said milking compartment, automatically controlled gates on said milking compartment for controlling the entry and exit of animals into and from said milking compartment, an automatic cleaning member for cleaning the teats of an animal in said milking compartment, said milking robot including a robot arm, said teat cups connected to said robot arm by a flexible member when the animal is being milked, said flexible member being retracted in said robot arm when a said teat cup is disconnected from a teat of an animal being milked in said milking compartment, means for determining the quality of milk received by said teat cup and for diverting low quality milk so that it is not mixed with high quality milk from animals milked in said milking compartment, a disinfecting device by means of which the udder of an animal that has been milked can be disinfected automatically after milking, a milk line system for transporting milk from said teat cup to a bulk milk tank and automatic cleaning means for cleaning said milk line system automatically, a time adjusted metering unit for said concentrate station by means of which a predetermined amount of concentrate is fed to an animal while being milked in said milking compartment, said robot arm comprising in series three parallelogram structures, the arrangement of each of said parallelogram structures being controlled by computer control means.

12. A system in accordance with claim 11, further comprising a detector for determining the positions of the teats of an animal to be milked in said milking compartment.

13. A system in accordance with claim 12, comprising a further robot arm independent from said robot arm, said further robot arm carrying and manipulating said detector, said further robot arm comprising manipulation means for manipulating said detector to determine the positions of the teats of an animal to be milked in said milking compartment and for disposing said further robot arm and said detector near one longitudinal side of said milking compartment when said detector is not being used to determine the positions of the teat of an animal to be milked in said milking compartment.

14. A system in accordance with claim 11, wherein said computer control means comprise piston and cylinder units.

15. A system in accordance with claim 11, wherein said computer control means comprise electromotors.

16. A system in accordance with claim 11, comprising teat cup disconnecting means for individually and automatically disconnecting teat cups from the teats of an animal being milked in said milking compartment when the specific udder quarter of a teat to which a said teat cup is connected has been milked out.

17. A system in accordance with claim 11, which further comprises a heat registration unit for measuring the temperature of an animal in said milking compartment.

18. A system in accordance with claim 11, comprising mastitis registration means for detecting mastitis in an animal being milked in said milking compartment.

19. A system in accordance with claim 11, comprising a computer program by means of which the herd to be milked in said milking compartment is divided into milk production groups and on the basis thereof a priority is defined for admitting an animal out of a milk production group into said milking compartment prior to another animal being admitted to said milking compartment out of another milk production group.

20. A system as claimed in claim 11, wherein said first and said second parallelogram structure being located in a first plane extending in the longitudinal direction of said milking compartment, said third parallelogram structure being located in a second plane which is disposed at an angle to said first plane.

\* \* \* \* \*